United States Patent
Qureshi et al.

(10) Patent No.: US 7,483,327 B2
(45) Date of Patent: Jan. 27, 2009

(54) APPARATUS AND METHOD FOR ADJUSTING AN OPERATING PARAMETER OF AN INTEGRATED CIRCUIT

(75) Inventors: Qadeer A. Qureshi, Dripping Springs, TX (US); James D. Burnett, Austin, TX (US); Jack M. Higman, Austin, TX (US); Thomas Jew, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 468 days.

(21) Appl. No.: 11/366,286

(22) Filed: Mar. 2, 2006

(65) Prior Publication Data

US 2007/0220388 A1  Sep. 20, 2007

(51) Int. Cl.
*G11C 5/14* (2006.01)
(52) U.S. Cl. ............... 365/226; 365/189.07; 365/189.12
(58) Field of Classification Search ............. 365/189.12
See application file for complete search history.

(56) References Cited

U.S. PATENT DOCUMENTS

| | | | |
|---|---|---|---|
| 4,326,269 A * | 4/1982 | Ludington | ............. 365/189.07 |
| 5,774,393 A | 6/1998 | Kuriyama | |
| 6,269,043 B1 * | 7/2001 | Batcher | ...................... 365/227 |
| 6,327,224 B1 | 12/2001 | Braceras et al. | |
| 6,643,204 B1 | 11/2003 | Agrawal | |
| 6,985,375 B2 * | 1/2006 | Baker | ......................... 365/148 |
| 7,327,185 B2 * | 2/2008 | Mair et al. | .................. 327/540 |
| 2005/0283630 A1 | 12/2005 | Shikata | |
| 2005/0289489 A1 | 12/2005 | Kim et al. | |

OTHER PUBLICATIONS

International Search Report for correlating PCT Patent Application No. PCT/US 07/61189 dated Feb. 29, 2008.

* cited by examiner

*Primary Examiner*—Tan T. Nguyen
(74) *Attorney, Agent, or Firm*—Daniel D. Hill; Joanna G. Chiu

(57) ABSTRACT

A method for adjusting an operating parameter of an integrated circuit having a memory and logic, where the logic includes a timing circuit, includes accessing the memory, determining a relative speed of the memory access with respect to a speed of the timing circuit, and selectively adjusting the operating parameter based on the relative speed. In one embodiment, an integrated circuit may include a ring oscillator, a shift register having a clock input coupled to an output of the ring oscillator, and compare logic coupled to an output of the shift register. The shift register is enabled in response to initiating a memory access to a memory and disabled in response to completing the memory access. The compare logic provides a relative speed indicator representative of a relative speed of the memory.

19 Claims, 3 Drawing Sheets

APPARATUS AND METHOD FOR ADJUSTING AN OPERATING PARAMETER OF AN INTEGRATED CIRCUIT

FIELD OF THE INVENTION

The present invention relates generally to integrated circuits, and more particularly, to an apparatus and method for adjusting an operating parameter of an integrated circuit.

RELATED ART

Generally, it is desirable for an integrated circuit to operate with the lowest possible power consumption. One way to reduce power consumption is to lower the power supply voltage to the integrated circuit. Also, it is desirable to operate the integrated circuit at the lowest power supply voltage under all process and temperature changes. However, lowering the power supply voltage reduces the switching speed of the transistors of the integrated circuit. Also, in an integrated circuit that has both memory cells and logic circuits, the rate of change in access time of memory circuits may be different than the rate of change in switching speed of logic circuits.

Therefore, in order to compensate for temperature and process changes in an integrated circuit having both memory cells and logic circuits, it would be useful to be able to determine the relative difference in induced speed variations caused by the power supply voltage, temperature and process changes for both memory cells and logic circuits.

BRIEF DESCRIPTION OF THE DRAWINGS

The present invention is illustrated by way of example and not limited by the accompanying figures, in which like references indicate similar elements, and in which.

Figure 1:
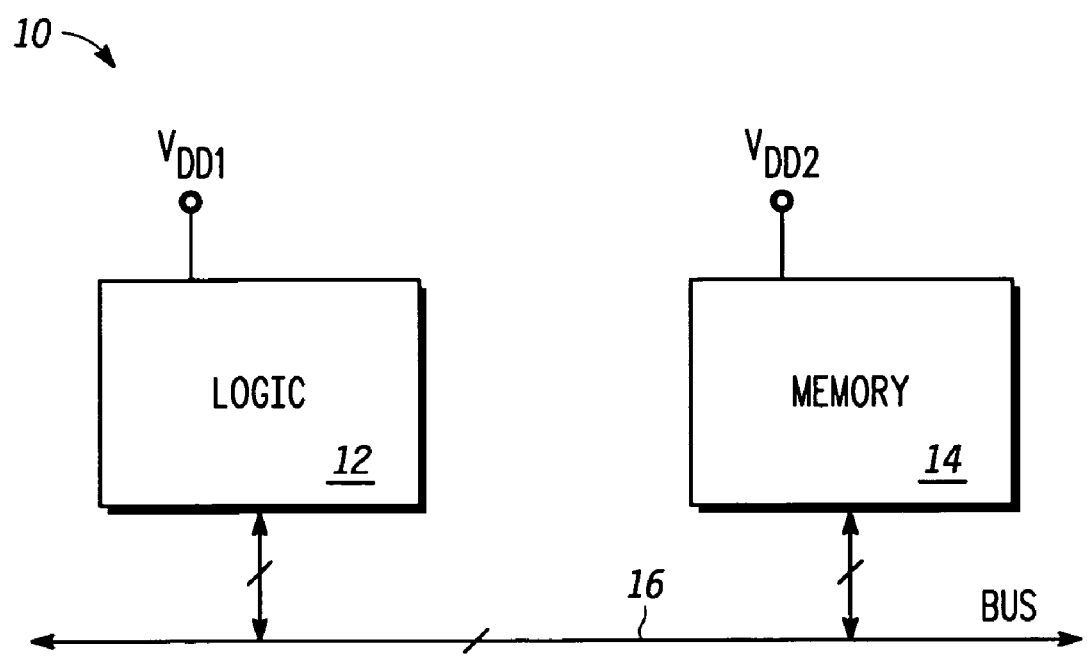
FIG. 1 illustrates, in block diagram form, an integrated circuit in accordance with an embodiment of the present invention.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF THE DRAWINGS

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, the plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Generally, the present invention provides an apparatus and method for adjusting an operating parameter of an integrated circuit having both a logic circuit and a memory. In the illustrated embodiment, the operating parameter to be adjusted is the power supply voltage to a memory on the integrated circuit. In another embodiment the operating parameter may be a clock frequency of the integrated circuit or an element of the integrated circuit environment, such as for example, temperature. The apparatus includes a ring oscillator, a shift register and compare logic. The ring oscillator provides a clock signal that is dependent on the ring oscillator's power supply voltage, temperature, and process. The clock signal is used to clock a shift register. The shift register begins a shifting operation in response to a read access to the memory. The shifting operation is terminated in response to completing the read access. The number of shifting operations is then compared to a predetermined value, where the predetermined value represents a desired operating speed of the memory. If the number of shifting operations is greater than the predetermined value, then the memory is slower than desired, and if the number of shifting operations is less than the predetermined value, then the memory is faster than desired. The power supply voltage can be adjusted to change the operating speed of the memory based on the comparison. In the illustrated embodiment, the speed of the memory is determined using a dummy path representing the worst case access time for the memory.

The disclosed embodiment provides a way to track the difference between logic performance and memory performance against changes in process, temperature, and voltage dynamically, in real time. The power supply voltages for the integrated circuit can then be adjusted for optimal performance of both the memory and the logic circuits.

FIG. 1 illustrates, in block diagram form, an integrated circuit 10 in accordance with an embodiment of the present invention. The integrated circuit 10 includes logic circuits 12 and a memory 14. The logic circuits 12 may include any type of digital circuit, such as for example, a data processor, an ASIC (application specific integrated circuit), or the like. In the illustrated embodiment, the integrated circuit 10 can be characterized as being a data processing system having an embedded memory. The memory 14 is coupled to the logic circuit 14 via a bus 16 and can be any kind of volatile or non-volatile memory. In the illustrated embodiment, memory 14 is a static random access memory (SRAM). In another embodiment, memory 14 may be a dynamic random access memory (DRAM), a magneto-resistive random access memory (MRAM), ferro-electric random access memory (FeRAM), flash, electrically erasable programmable read only memory (EEPROM), and the like. Also, the logic circuits 12 may be coupled directly to the memory 14 instead of via the bus 16. Also, the integrated circuit 10 may be a stand-alone memory where the logic circuits 12 are the peripheral circuitry for accessing the memory.

The logic circuits 12 are coupled to a power supply voltage terminal labeled "VDD1" and the memory 14 is coupled to a power supply voltage terminal labeled "VDD2". In the illustrated embodiment, VDD1 and VDD2 receive positive power supply voltages with respect to ground and are supplied separately. Also, power supply voltage VDD1 may, or may not, be equal to VDD2. Note that the illustrated embodiment shows two independent power supply voltages. In other embodiments, there may be more than two power supply voltages. Also, in other embodiments, there may be only one power supply voltage. In addition, the power supply voltages may be negative with respect to ground in other embodiments.

Figure 2:
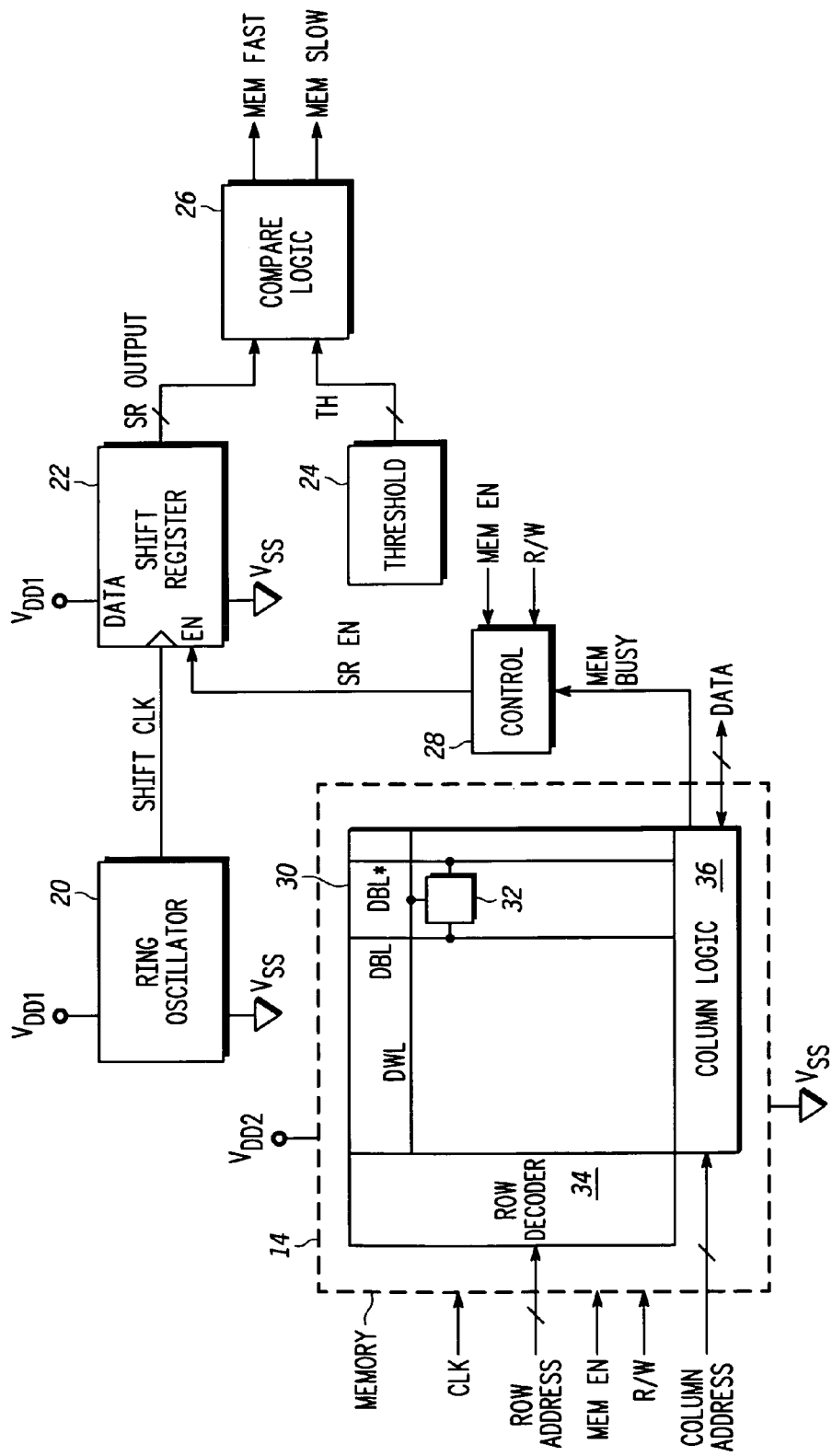
FIG. 2 illustrates, in block diagram form, a portion of the integrated circuit of FIG. 1.

FIG. 2 illustrates, in block diagram form, a portion of the integrated circuit 10 of FIG. 1. FIG. 2 includes the memory 14, a ring oscillator 20, a shift register 22, a register 24, a compare logic circuit 26, and a control circuit 28. The memory 14 includes a memory array 30, a row decoder 34, and column logic 36. The memory array 30 is a conventional SRAM array and includes a plurality of SRAM cells coupled to bit line pairs and to word lines. The memory array 14 may also have the memory cells organized into multiple blocks of memory cells (not shown). In addition, the memory array 30 includes a "dummy path" for duplicating a worst case critical timing path for a memory access. A dummy path may be implemented as part of the memory or as a separate circuit having elements for copying each of the delays in the memory. The dummy path is also implemented to track any changes in process and/or temperature in the same way as the memory 14. In the illustrated embodiment, the dummy path is represented by a dummy memory cell 32 coupled to a dummy word line (DWL) and to a dummy bit line pair (DBL/DBL*). Note that the asterisk (*) is used to represent that the dummy bit line DBL* is the logical complement of the dummy bit line DBL. The dummy bit lines, dummy word lines, and the dummy memory cell are identical to the actual bit lines, word lines and memory cells of memory array 30. The memory 14 has an input for receiving a clock signal labeled "CLK", an input for receiving a plurality of address signals labeled "ROW ADDRESS" and "COLUMN ADDRESS", an input for receiving a memory enable signal labeled "MEM EN", and an input for receiving a read/write signal labeled "R/W". The column logic 36 receives the signals COLUMN ADDRESS and includes column decoders and sense amplifiers for sensing and amplifying the relatively small bit line voltages. In addition, the memory array 30 is coupled to the power supply voltage terminal VDD2 and to a power supply voltage terminal labeled "VSS". In the illustrated embodiment, VDD2 is for receiving a power supply voltage of about 1.2 volts and VSS is coupled to ground. A plurality of bidirectional terminals is used for transmitting data signals DATA to and from the memory 14.

The memory 14 operates as a conventional embedded RAM. The memory enable signal MEM EN is asserted to start an access to memory 14. The read/write signal R/W determines whether the access is a read access or a write access. A row address is provided to select a word line and a column address is provided to select a bit line pair. Note that in some embodiments, there may be only a single bit line coupled to a column of memory cells instead of a pair. A memory cell coupled to the selected word line and bit line pair is accessed for a read or write operation depending on the state of read/write signal R/W. In the case of a write cycle, a data bit is transmitted to the bit line pair via the column logic 36 and stored in the memory cell. In the case of a read cycle, a data bit is provided by the memory cell to the selected bit line pair and output from the memory via the column logic 36 as data signals DATA. The data signals DATA may be provided to, for example, the bus 16 of FIG. 1 for use by logic circuits 12. A data processor may provide the control, data, and address signals that are provided to the memory 14.

Ring oscillator 20 is a conventional ring oscillator having a plurality of inverters coupled in a feedback path and is coupled to a power supply voltage terminal labeled "VDD1" and to a power supply voltage terminal labeled "VSS". The ring oscillator 20 provides a clock signal labeled "SHIFT CLK" that varies in response to changes in power supply voltage, process, and temperature. The clock signal is provided to a clock input of the shift register 22. The ring oscillator 20 tracks process, temperature, and power supply variations in the same manner as the logic circuits 12, and the power supply voltage provided to ring oscillator 20 is the same as the power supply voltage provided to logic circuits 12. Also note that the power supply voltage provided to VDD1 may be the same as the voltage provided to VDD2 or may be different.

The shift register 22 is a conventional shift register having a plurality of stages coupled together in series. The number of stages is dependent upon the number of inverters in the ring oscillator 20 and the speed of the logic circuits 12 and memory 14. The shift register 22 is enabled by a control signal labeled "SR EN" from the control circuit 28. The control circuit 28 receives the memory enable signal MEM EN, the read/write signal R/W, and a signal representing the operating state of the memory labeled "MEM BUSY". The control signal SR EN enables the shift register 22 to begin a shifting operation in response to the start of a read access of the memory 14. The shift register 22 shifts, for example, a logic one from an input stage toward the output stage in response to the clock signal SHIFT CLK. At the end of a memory operation the control signal SR EN causes the shift register 22 to end a shifting operation. At the end of the shifting operation the number of stages that contain a logic one is compared against a predetermined value, or threshold, stored in the register 24. More specifically, the compare logic 26 has an input for receiving the output from the shift register 22 labeled "SR OUTPUT" and an input for receiving the predetermined value labeled "TH" from the register 24. The value TH represents the desired operating speed of the memory. The compare logic 26 compares the value SR OUTPUT to the value TH and provides one of a memory slow signal labeled "MEM SLOW" and a memory fast signal labeled "MEM FAST". The MEM SLOW signal indicates that the memory is slower than the desired operating speed of the memory. The operating speed of the memory may be increased by, for example, increasing the power supply voltage to the power supply voltage terminal VDD2 to the memory. On the other hand, the MEM FAST signal indicates that the memory is operating faster than the desired operating speed of the memory. If the MEM FAST signal is provided, the power supply voltage provided to VDD2 may be decreased to conserve power consumption of the integrated circuit 10. In the illustrated embodiment, the desired operating speed of the memory 14 is relative to the speed of the logic circuits 12 as determined by the speed of the ring oscillator 20. Note that in other embodiments, there may be more than one predetermined threshold voltage TH to compare against the signal SR OUTPUT.

The shift register 22 is cleared upon completion of the comparison step. Also, the shift register 22 may be cleared when and if the integrated circuit 10 is cleared. For the purposes of clarity and simplicity, the means for resetting or clearing the shift register 22 is not shown but is well known in the art. Also, in other embodiments, the shift register 22 may be replaced with a counter that outputs a count value to compare with the threshold TH.

Figure 3:
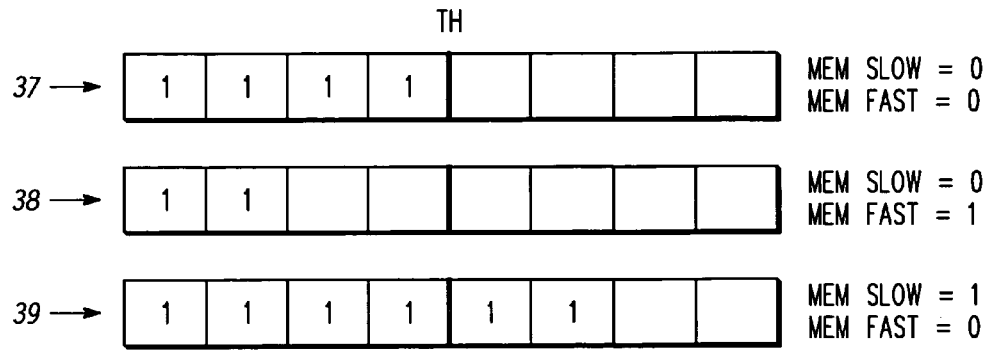
FIG. 3 illustrates several comparison results for the compare logic of FIG. 2.

FIG. 3 illustrates several possible comparison results for the compare logic of FIG. 2. In FIG. 3, shift register 22 is shown having 8 bits for illustration purposes. In an actual embodiment, shifter register 22 may have, for example, 32 or 64 bits. The mid point of the shift register 22 is marked with "TH", indicating the bit position for the desired memory operating speed in the illustrated embodiment. In other embodiments, the desired memory operating speed may coincide with another bit position of shift register 22.

In an example 37, a logic one is shifted into the left side of shift register 22 in response to a memory read operation being started as indicated by control signal SR EN being asserted. At the end of the read operation, as indicated by the control signal SR EN being deasserted, the logic one has been shifted to the fourth bit position. Because the SR output is equal to value TH, the output signal MEM SLOW is zero and the output signal MEM FAST is zero, indicating that the memory is operating at the desired speed and therefore the power supply voltage VDD2 provided to the memory 14 is optimal.

In an example 38, a logic one is shifted into the left side of shift register 22 in response to a memory read operation being started as indicated by control signal SR EN being asserted. At the end of the read operation, the logic one has been shifted to the second bit position. The SR OUTPUT is less than the value TH, indicating that the memory is faster than desired. The compare logic 26 outputs a logic zero MEM SLOW and a logic one MEM FAST. In response to the comparison output, a system that includes memory 14 may cause an interrupt to be generated and the power supply voltage to memory 14 to be lowered by a predetermined amount. On the next memory read access, the speed will be checked again and another incremental adjustment to VDD2 will be made if necessary.

An example 39 illustrates a case where the SR OUTPUT is higher than the value TH. At the end of the read operation, the logic one has been shifted to the sixth bit position. The compare logic 26 will output a logic one MEM SLOW and a logic zero MEM FAST. An interrupt may be generated in the integrated circuit 10 and the power supply voltage VDD2 adjusted higher to increase the speed of the memory operations. On the next and subsequent read operations, the speed will be checked and other adjustments made to the power supply voltage VDD2 if necessary.

Figure 4:
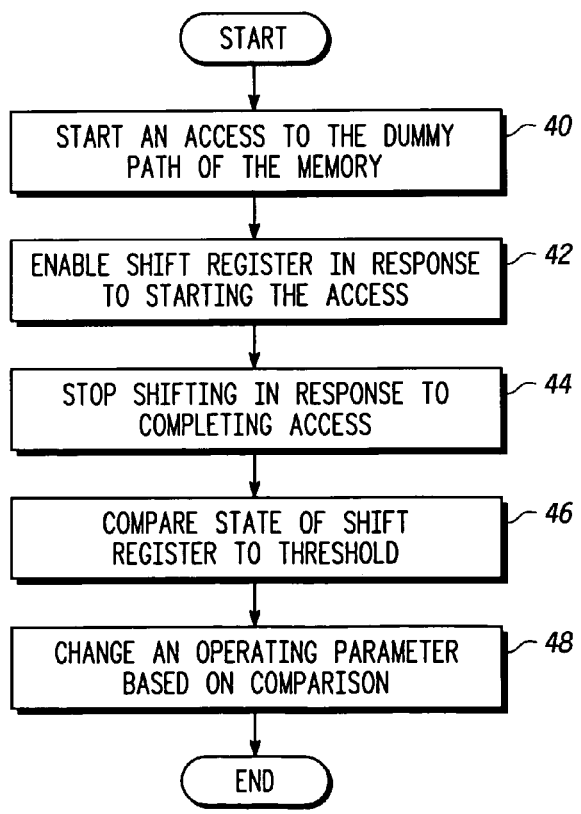
FIG. 4 illustrates a method for changing an operating parameter of the integrated circuit of FIG. 1.

FIG. 4 illustrates a method for changing an operating parameter of the integrated circuit of FIG. 1. In the illustrated embodiment, the operating parameter is the power supply voltage to the memory. In other embodiments, the operating parameter may be another user-controlled or environment variable for the memory. In the illustrated embodiment, a "user" can be a human operator or another portion of a system that includes integrated circuit 10. At step 40, an access to the memory is begun and a worst case critical path for the access is timed using the dummy path in the memory. A portion of the dummy path includes the dummy word line DWL and the dummy bit line pair DBL/DBL* as illustrated in FIG. 2. Other portions of the dummy path are not illustrated but would be included in other parts of the memory that affect the access time of the memory. At step 42, the shift register 22 is enabled in response to the read access by an asserted control signal SR EN. At step 44, the end of the read access is detected by the control logic 28 receiving a deasserted MEM BUSY signal. The control signal SR EN is deasserted causing the shift register 22 to stop shifting. The shift register output SR OUTPUT is provided as an input to the compare logic 26. At step 46, the state of the shift register 22 is compared with a value representing the desired operating speed of the memory. The state of shift register 22 is determined by how many stages across the shift register a bit is shifted as discussed above in reference to FIG. 3. Also, the shift register 22 is cleared by a reset signal (not shown) as discussed above. If the number of shifted bits is greater than the threshold TH, then the memory is slower than desired. If the number of shifted bits is less than the threshold TH, the memory is faster than desired. At step 48, an operating parameter of the memory is changed in response to the comparison of step 46. In the case where the number of shifted bits is less than the threshold TH, the power supply voltage VDD2 may be reduced to slow down the memory and conserve power. In the case where the number of shifted bits is greater than the threshold TH, the power supply voltage VDD2 is raised to increase the speed of the memory.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. The terms a or an, as used herein, are defined as one or more than one. The terms including and/or having, as used herein, are defined as comprising (i.e., open language). As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for adjusting an operating parameter of an integrated circuit having a memory and logic, the logic coupled to the memory and comprising a timing circuit, the method comprising:
    accessing the memory;
    comparing a speed of the memory access to a speed of the timing circuit; and
    based on a result of the comparing, selectively adjusting the operating parameter of the memory to change the speed of the memory access with respect to the speed of the timing circuit.

2. The method of claim 1, wherein the selectively adjusting the operating parameter comprises selectively adjusting a supply voltage of the memory.

3. The method of claim 1, wherein the comparing the speed of the memory access to the speed of the timing circuit comprises:
    in response to starting the memory access, enabling a shift register clocked by the timing circuit;
    in response to completing the memory access, stopping shifting of the shift register; and after the stopping the shifting, using a state of the shift register to determine the result.

4. The method of claim 1, wherein the comparing the speed of the memory access to the speed of the timing circuit comprises:
    counting a number of pulses generated by the timing circuit during the memory access; and
    using the number of pulses to determine the result.

5. The method of claim 1, wherein the timing circuit comprises a ring oscillator, and
    wherein a speed of the timing circuit corresponds to a frequency of the ring oscillator.

6. The method of claim 1, wherein the selectively adjusting the operating parameter comprises selectively adjusting a frequency of a clock of the data processing system.

7. The method of claim 1, wherein the accessing the memory comprises accessing a dummy path corresponding to the memory.

8. The method of claim 7, wherein the dummy path comprises a worst case path of the memory.

9. The method of claim 1, wherein adjusting the operating parameter of the memory comprises increasing a supply voltage to the memory to increase the speed of the memory access and decreasing the supply voltage to the memory to decrease the speed of the memory access.

10. A method for adjusting an operating parameter of a data processing system having a memory and logic, the logic coupled to the memory and comprising a timing circuit, the method comprising:
   initiating a memory access;
   in response to the initiating, enabling counting circuitry to count pulses generated by the timing circuit;
   in response to completing the memory access, the counting circuitry outputting a count value;
   using the count value to determine a relative speed of the memory access; and
   based on the relative speed, selectively adjusting a supply voltage of the data processing system.

11. The method of claim 10, wherein the relative speed indicates whether an operating speed of the memory is faster, slower, or equal to an operating speed of the logic.

12. The method of claim 10, wherein the timing circuitry comprises a ring oscillator, and wherein the relative speed of the memory access is relative to a frequency of the ring oscillator.

13. The method of claim 12, wherein the counting circuitry comprises a shift register clocked by the ring oscillator, and wherein the enabling the counting circuitry comprises enabling the shift register.

14. The method of claim 10, wherein the memory access comprises an access to a dummy path of the memory.

15. The method of claim 10, wherein the using the count value to determine the relative speed comprises comparing the count value to a threshold value.

16. The method of claim 15, wherein the threshold value represents a desired value of an operating speed of the memory.

17. An integrated circuit, comprising:
   a ring oscillator;
   a shift register having a clock input coupled to an output of the ring oscillator, the shift register being enabled in response to initiating a memory access to a memory and disabled in response to completing the memory access; and
   compare logic coupled to an output of the shift register, wherein the compare logic compares the output of the shift register with a threshold value and providing a relative speed indicator representative of a relative speed of the memory access.

18. The integrated circuit of claim 17, wherein a data input of the shift register is coupled to a fixed voltage representative of a known logic state.

19. The integrated circuit of claim 17, wherein the relative speed indicator is representative of the relative speed of the memory to a frequency of the ring oscillator.

* * * * *